(12) United States Patent
Rasche

(10) Patent No.: US 12,200,378 B2
(45) Date of Patent: Jan. 14, 2025

(54) LENS SHADING CORRECTION TO MINIMIZE DATA LOSS

(71) Applicant: Google LLC, Mountain View, CA (US)

(72) Inventor: Karl Rasche, Kernersville, NC (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/022,710

(22) PCT Filed: Aug. 26, 2020

(86) PCT No.: PCT/US2020/070464
§ 371 (c)(1),
(2) Date: Feb. 22, 2023

(87) PCT Pub. No.: WO2022/046154
PCT Pub. Date: Mar. 3, 2022

(65) Prior Publication Data
US 2023/0362506 A1  Nov. 9, 2023

(51) Int. Cl.
*H04N 25/611* (2023.01)
*G06T 5/80* (2024.01)
*H04N 23/84* (2023.01)

(52) U.S. Cl.
CPC .............. *H04N 25/611* (2023.01); *G06T 5/80* (2024.01); *H04N 23/843* (2023.01); *G06T 2207/10004* (2013.01)

(58) Field of Classification Search
CPC .... H04N 25/611; H04N 23/843; H04N 25/61; G06T 5/80; G06T 2207/10004
See application file for complete search history.

(56) References Cited

U.S. PATENT DOCUMENTS

2015/0070537 A1  3/2015  Bai et al.
2015/0296193 A1  10/2015  Cote et al.

OTHER PUBLICATIONS

Goma et al., "Camera technology at the dawn of digital renascence era," Presented at 44th ASILOMAR Conference on Signals, Systems and Computers, Pacific Grove, CA, USA, Nov. 7-10, 2010, 847-850.
International Preliminary Report on Patentability in International Appln. No. PCT/US2020/070464, mailed on Mar. 9, 2023, 8 pages.
International Search Report and Written Opinion in International Appln. No. PCT/US2020/070464, mailed on Mar. 3, 2022, 11 pages.

*Primary Examiner* — Twyler L Haskins
*Assistant Examiner* — Angel L Garces-Rivera
(74) *Attorney, Agent, or Firm* — Fish & Richardson P.C.

(57) ABSTRACT

A method including receiving a raw image and a stored calibration, determining a lens shading correction (LSC) gain based on the stored calibration, factoring the LSC gain into a factored gain including a local tone mapping (LTM) gain and a factored LSC gain, and applying the factored gain to the raw image to generate a corrected image.

19 Claims, 11 Drawing Sheets

LENS SHADING CORRECTION TO MINIMIZE DATA LOSS

CROSS-REFERENCE TO RELATED APPLICATION

This application is a National Stage Application under 35 U.S.C. § 371 and claims the benefit of International Application No. PCT/US2020/070464, filed on Aug. 26, 2020. The contents of this application is incorporated herein by reference in its entirety.

FIELD

Embodiments relate to image processing to correct for lens shading which is a typical error that occurs with images captured using a photosensor(s). Photosensors are often used in digital photography.

BACKGROUND

Photosensors generate a single channel, two-dimensional array (x,y) of pixels having four colors. The four colors typically include 25% red, 50% green, and 25% blue (RGGB). Other colors and configurations are sometimes used. The pixel array can be processed by an image processing pipeline that generates a color image including three values (e.g., red, green, and blue (RGB) or one luma and two chrominance (e.g., YUV)). In the image processing pipeline the RGGB pixel array can be converted to a pixel having RGB values or YUV values using a demosaicing algorithm or a debayering algorithm to interpolate RGB values.

When light is focused onto a photosensor (e.g., by one or more cylindrical lenses), more light can be focused onto a center of the photosensor (i.e., located along an optical axis of the lenses) than onto edges or corners of the photosensor. Without correction, this phenomenon, sometimes known as lens shading or vignetting) can lead to images produced by the photosensor that appear distorted or unrealistic.

SUMMARY

In a general aspect, a device, a system, a non-transitory computer-readable medium (having stored thereon computer executable program code which can be executed on a computer system), and/or a method can perform a process with a method including receiving a raw image and a stored calibration, determining a lens shading correction (LSC) gain based on the stored calibration, factoring the LSC gain into a factored gain including a local tone mapping (LTM) gain and a factored LSC gain, and applying the factored gain to the raw image to generate a corrected image.

In another general aspect, a device, a system, a non-transitory computer-readable medium (having stored thereon computer executable program code which can be executed on a computer system), and/or a method can perform a process with a method including receiving a raw image and a stored calibration, determining a lens shading correction (LSC) gain based on the stored calibration, factoring the LSC gain into a factored gain including a local tone mapping (LTM) gain and a factored LSC gain, updating the LTM gain based on a data loss associated with applying the factored LSC gain to the raw image, applying the updated factored LSC gain to the raw image to generate an LSC corrected image, updating the LTM gain based on a number of clipped pixels associated with applying the LTM gain to the LSC corrected image, and applying the updated LTM gain to the LSC corrected image to generate a corrected image.

Implementations can include one or more of the following features. For example, the factoring of the LSC gain can includes determining a minimum gain for each color channel of the LSC gain, setting the LTM gain to the minimum of the determined minimum gain, and calculating the factored LSC gain for each color channel based on the LSC gain and the LTM gain. The LSC gain can includes determining a minimum gain for each color channel of the LSC gain and normalizing each color channel of the LSC gain based on the minimum of the determined minimum gain. The method can further include determining an amount of LSC data loss based on the raw image and the factored LSC gain, determining an adjustment factor based on the amount of LSC data loss, and updating the LTM gain using the adjustment factor to reduce the amount of LSC data loss. The amount of LSC data loss can correspond to a number of clipped pixels.

The LTM gain can be an initial LTM gain, and an updated LTM gain can be determined based on one of the initial LTM gain or the updated LTM gain and a calculated number of clipped pixels. The LTM gain can be an initial LTM gain and the method can further include applying the initial LTM gain an LSC corrected image, determining a number of clipped pixels, and determining an updated LTM gain on one of the initial LTM gain and the number of clipped pixels. The determining of the number of clipped pixels can include calculating image statistics of the raw image and computing an estimate of the number of clipped pixels based on the image statistics and the initial LTM gain. The applying of the factored gain to the raw image to generate a corrected image can includes applying the LSC gain to the raw image to generate an LSC corrected image, and applying the LTM gain to the LSC corrected image and the LSC gain can be reduced to prevent clipping and the LTM gain can be updated based on the reduced LSC gain.

BRIEF DESCRIPTION OF THE DRAWINGS

Example embodiments are described the detailed description given herein below and the accompanying drawings, wherein like elements are represented by like reference numerals, which are given by way of illustration only and thus are not limiting of the example embodiments and wherein.

Figure 1:
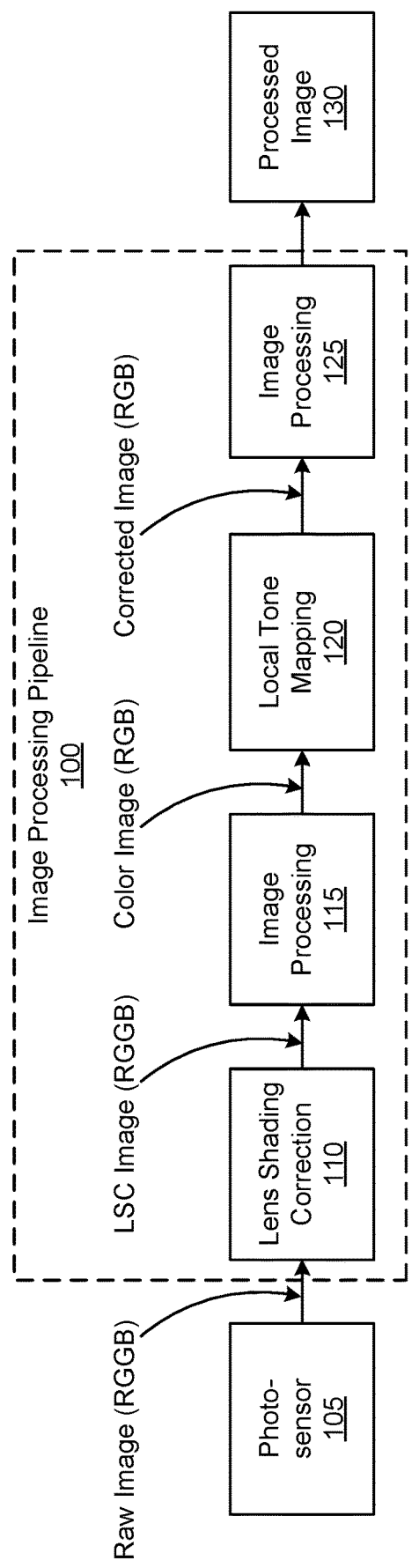
FIG. 1 illustrates a signal flow for generating a lens shaded correction (LSC) image according to at least one example embodiment.

It should be noted that the drawings are intended to illustrate the general characteristics of methods, structure and/or materials utilized in certain example embodiments and to supplement the written description provided below. The drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

An image processing pipeline(s) can include a process to correct for lens shading distortions in image data received from a photosensor, where the lens shading can result in distortions on the edges (sides, top, and bottom) and corners of an interpolated RGB pixel image. This image correction process can be known as lens shading correction (LSC). LSC can use a variable, pixel-dependent gain to modify the values of RGB for each pixel, for example, by boosting the values of RGB values for pixels at the periphery of the photosensor more than values for pixels at the center of the photosensor.

In some implementations, the gain values applied to data produced by an image sensor can be described by a hyperbolic function with the center of the hyperbola (the foci or the vertices) corresponding to the center pixel of the photosensor and having a minimum gain and having peak gain at pixels on corners of the sensor. However, example implementations can include gain be described by other functions (e.g., not hyperbolic or parametric) and can include functions that are off-center (e.g., not centered on the sensor).

In some implementations, the LSC gain algorithm can apply a variable gain that depends not only on the location of a pixel on the photosensor but also depends on the color of the light received by the pixel. Thus, the LSC gain, $G_{LSC}$, can be represented as:

$$G_{LSC} = G(x, y, \lambda).$$

In general, color values for the R, G, and B values for a pixel are digitally encoded in values from zero to a maximum value (e.g., from 0 to 255 for 8-bit data encoding, from 0 to 1023 for 10-bit data encoding, from 0 to 4095 for 12-bit data encoding, from 0 to 16383 for 14-bit data encoding, from 0 to 65535 for 16-bit data encoding, and the like). If for any reason application of the LSC gain algorithm results in a pixel color value (e.g., R, G, or B) exceeding the maximum value, the resultant color pixel value is clipped, which sets a color pixel value to the maximum pixel color value. For example, if an LSC gain calculation results in the red color value for a pixel being equal to 16497 for 14-bit data, the red color value for a pixel can be set to 16383 as a result of the clipping. Clipping can result in undesirable image quality. For example, clipping can result in an image having a loss of dynamic range (e.g., flat color or intensity). Clipping can result in false colors (e.g., the ratio of red to green to blue being incorrect).

Example implementations described herein can minimize, prevent, or eliminate clipping in an LSC process in an image processing pipeline. For example, in some implementations a reduced gain can be applied in the LSC process of the imaging process pipeline, and the gain that is omitted during the LSC process but that is needed to correct lens shading errors can be applied during other processing steps of the imaging process pipeline. For example, the LSC process can apply a color dependent gain to pixels, but can omit, or reduce, the application of a gain that is color-independent. In some implementations a local tone mapping LTM process that is also part of the imaging pipeline can apply a color-independent gain to pixel image data to correct for lens shading errors, so that geometry-dependent gain in the LSC process can be reduced without loss of quality in the final image. In some implementations, the LSC process can apply both color-dependent gain and color-independent gain (without causing clipping) and some portion of the color-independent gain being applied in the LTM process. In other words, the gain to provide LSC can be split (equally or not equally) between the LSC process and the LTM process.

FIG. 1 illustrates a signal flow for generating an LSC image according to at least one example embodiment. As shown in FIG. 1, an image processing pipeline 100 can receive a raw image from a photosensor 105 and generate a processed (e.g., in corrected) image 130. The image pipeline includes a lens shading correction (LSC) 110 block, a first image processing 115 block, a local tone mapping (LTM) 120 block, and a second image processing 125 block.

The lens shading correction (LSC) 110 block can be configured to perform at least partial LSC on the raw image (RGGB). LSC can improve illumination uniformity and color. The LSC can improve illumination uniformity using a variable gain that is applied to data from each pixel. The gain applied to data generated as a pixel can be based on a variety of factors, including the location of pixel on the photosensor 105 and the color of light received at the pixel. The gain values to be applied can be pre-installed or stored in the device or can be determined during a device calibration process. In an example implementation, the variable (e.g., hyperbolic) gain can be adjusted to minimize, prevent or eliminate clipping of the signal. In an example implementation, the LSC gain to be applied to pixel data to correct for lens shading distortions can be separated or factored into two portions. The two portions can be a color-dependent correction and a color-independent correction, where the color-independent gain correction is applied based on pixel luma (or luminance). For example, more color-independent gain can be applied to darker pixels and less gain can be applied to brighter pixels. In an example implementation, the color-independent gain, sometimes called gain factors or factored gain, can be adjusted based on pixel data loss.

The first image processing 115 block can be configured to perform at least one image processing operation on the tone mapped raw image. For example, the single channel tone mapped raw image (RGGB) can be converted to pixels with three dimensions, three channels or three colors (e.g., YUV or RGB) in a demosaicing or debayering process. In other words, at least one image processing operation can generate RGB values for a pixel from interpolated RGGB values for the pixel (e.g., demosaicing or debayering).

Figure 10B:
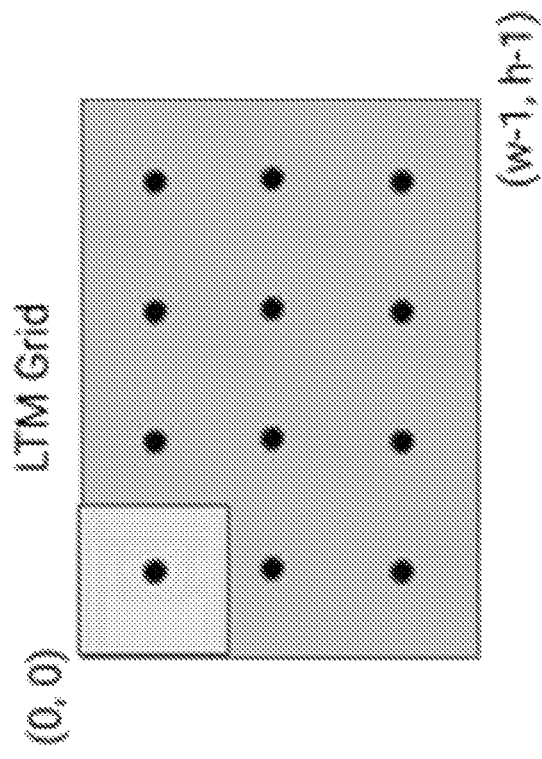
FIG. 10B illustrates an LTM grid according to at least one example embodiment.

The local tone mapping (LTM) 120 block can be configured to tone map the LSC-corrected RGB image. Local tone mapping can include increasing intensity and/or a tone of the pixels in an image. In other words, LTM can relate to intensity. In an example implementation, the LTM 120 block can apply gain based on pixel luminance. For example, more color-independent gain can be applied to darker pixels and less gain can be applied to brighter pixels. The LTM can be based on a grid having a constant size (number of rows and number of columns, e.g., 3×4, 4×3, 6×8, 8×6, 16×12, 12×16 and the like) (see, for example, FIG. 10B illustrating a 4×3 grid as an example). LTM can include changing a luminance value associated with, and/or the luminance values of, neighboring pixels. Therefore, for each pixel, the computation (e.g., gain) can be varied based on an average over a local neighborhood of pixels. In an example implementation, the luminance value of a single pixel may be changed based on a variable color-independent gain. In other words, each pixel can have a red value, a green value, a blue value, and a luminance value and the gain can be applied to the luminance value.

As discussed above, the LSC gain to be applied to pixel data to correct for lens shading distortions can be separated or factored into two portions. The two portions can be a variable color-dependent gain and a variable color-independent gain. In an example implementation, the variable, color-dependent gain can be applied in the LSC 110 block. Then, the portion of the LSC gain correction that is not applied in the LSC process in LSC 110 block (e.g., the color-independent gain) can be applied during the LTM process in the LTM block 110. The variable color-dependent gain and/or the variable color-independent gain, sometimes called gain factors or factored gain, can be adjusted from an initial gain such that clipping due to the LSC processing is minimized, prevented or eliminated (in at least one of the LSC 110 block and the LTM 120 block).

The second image processing 125 block can be configured to perform at least one image processing operation on the LSC-corrected, LTM-corrected image. For example, the at least one image processing operation can include white-balance, color correction, noise reduction, sharpening, gamma encoding and/or the like.

Figure 2:
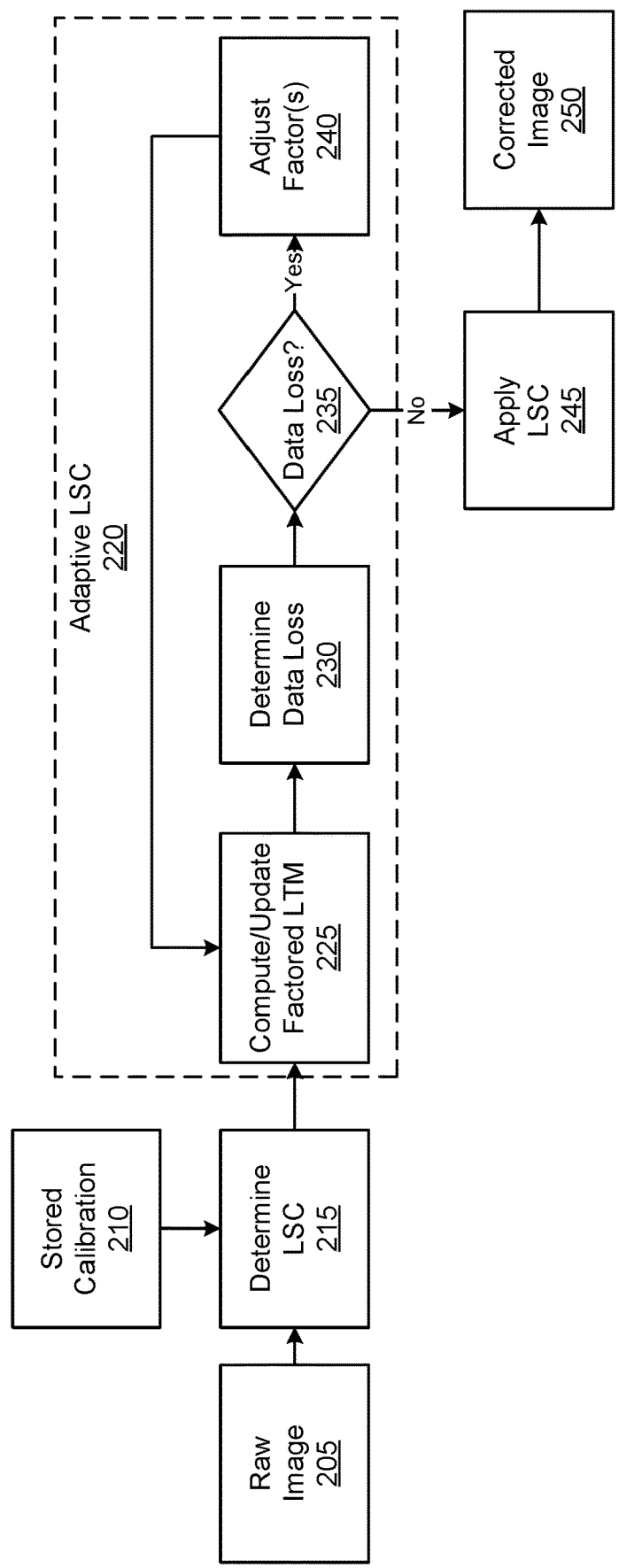
FIG. 2 illustrates a signal flow for generating LSC factors according to at least one example embodiment.

FIG. 2 illustrates a signal flow for generating LSC factors according to at least one example embodiment. As shown in FIG. 2, the signal flow 200 includes a raw image 205 block, a stored calibration 210 block, a determine LSC 215 block, an adaptive LSC 220 block, an apply LSC 245 block, and a corrected image 250 block. The adaptive LSC 220 block includes a compute/update factored LTM 225 block, a determine data loss 230 block, a check data loss 235 block, and an adjust factor(s) 240 block.

The raw image 205 block can be or include a raw image as captured by a photosensor(s). The raw image can be a single channel, two-dimensional array (x, y) of pixels having four colors. For example, the four colors typically include 25% red, 50% green, and 25% blue sometimes referred to as RGGB (red, green, green, blue).

The stored calibration 210 block can include calibration files based on the photosensor(s). The calibration files can include data based on flaws (e.g., missing pixels), errors (e.g., shading), correction parameters, and/or the like. In an example implementation, calibration data can include at least one image or raw image sometimes called a light reference. In some implementations, calibration files can be images and/or data that are pre-loaded (e.g., at the factory) in the device and/or captured during a user-initiated calibration process.

The determine LSC 215 block can be configured to select calibration files for LSC from the stored calibration 210. In an example implementation, the determine LSC 215 block can be configured to select at least one image. The at least one image can be a plurality of images that can be averaged. The at least one image can be a light image. Further, the determine LSC 215 block can be configured to calculate a baseline or initial LSC (LSC gain or LSC gain profile(s)) based on the selected calibration files (e.g., an image). For example, the LSC can be based on a grid (e.g., 12×16) having a constant size (number of rows and number of columns) (see, for example, FIG. 10A). In some implementations, the LSC grid can have a higher resolution than the LTM grid.

The LSC (or variables used to determine gain) can be determined for each corner of the blocks of the grid, sometimes called a mesh or gain profile. The LSC can be determined based on the selected calibration files (e.g., an image) where the value for the LSC can be selected from the selected calibration files (e.g., luminance) and/or can be calculated based on the selected calibration files (e.g., derived from luminance). The LSC or LSC profile can include an LSC profile for each channel (e.g., color). In other words, there can be an $LSC_{red}$, $LSC_{green}$, and a $LSC_{blue}$ (See FIG. 9, graph 910 or $LSC_{\{rggb\}}$). In some implementations, the LSC can be used in a single channel, two-dimensional array (x, y) of pixels having four colors. Therefore, the LSC can be $LSC_{RGGB}$ (noting the LSC profile can be the same for both greens).

The compute/update factored LTM 225 block can be configured to factor the LSC (e.g., gain values) and/or update the LTM. Initially, the compute/update factored LTM 225 block can be configured to factor the baseline or initial LSC. For example, the LSC can be factored into a color-dependent correction (see FIG. 9, graph 920 or $LSC'_{\{rggb\}}$) and color-independent correction (see FIG. 9, graph 930 or LTMGain(0))). The factored LSC can be normalized such that the smallest gain (e.g., at the center of the image) normalized (e.g., to some value that minimizes gain like one(1)). The factored LSC can be normalized by the minimum channel (e.g., red, green, or blue) gain.

The compute/update factored LTM 225 block can be configured to update the factored LSC. For example, the compute/update factored LTM 225 block can receive an adjustment factor or a scale variable(s) (or factor(s)) used to update (increase or decrease) the factored LSC. The adjustment factor or scale variable(s) can be received from the adjust factor(s) 240 block. The compute/update factored LTM 225 block can add, subtract, multiply, divide, and the like the factored LSC by the adjustment factor or scale variable(s). The adjustment factor or scale variable(s) can be used on each LSC channel (RGB or RGGB). Alternatively, or in addition to, the adjustment factor can be an offset. The offset can be added to or subtracted from the factored LSC (or LSC'). The offset can be increased or decreased to vary the factored LSC. The offset can be generated/varied by the adjust factor(s) 240 block.

The determine data loss 230 block can be configured to determine an amount of information that may be lost in the corrected image should the factored LSC be applied to the raw image 205. For example, the determine data loss 230 block can be configured to determine an amount of loss due to clamping to the maximum of the data range, an amount saturation loss, an amount of shadow loss, an amount of texture loss, an amount of color bleeding (e.g., between image regions), an amount of edge blur, and/or the like. The data loss can be a weighted average of each of a plurality of information lost. For example, saturation loss can be given a larger weight than shadow loss.

The check data loss 235 block can be configured to compare the data loss to some criterion or a threshold value. If the data loss fails the criterion or is greater than (or less than) the threshold value, processing continues to the adjust factor(s) 240 block. If the data loss passes the criterion or is less than/equal to (or greater than/equal to) the threshold value, processing continues to the apply LSC 245 block.

The adjust factor(s) 240 block can be configured to determine adjustment factor or scale variable(s) (or factor (s)), and/or an offset to be used to reduce gain associated with the LSC. The adjustment factor or scale variable(s) can be based on the variables use in the compute/update factored LTM 225 block. The adjustment can be done on a per-intensity region, a factor or scale variable(s) can be based on the data loss. The adjustment factor or scale variable(s) can be a default value(s). The adjustment factor or scale variable(s) can vary based on the number of times the scale variable(s) have been determined (e.g., a relatively large value when few scale variables have been calculated and a relatively small value when many scale variables have been calculated). An offset can be added to or subtracted from the factored LSC (e.g., LSC').

The apply LSC 245 block can be configured to cause or help cause the factored LSC (e.g., LSC') to be applied. For example, the factored LSC (e.g., gain, mesh or gain factors) can be communicated (or be an element of) to the LSC 110 block. In an example implementation, a portion of the factored gain can be communicated to the LTM 110 block. The corrected image 250 block can be the resultant image after the factored LSC has been applied. The lens shading corrected image 250 can continue to additional processing (e.g., the image processing 125 block).

Figure 3:
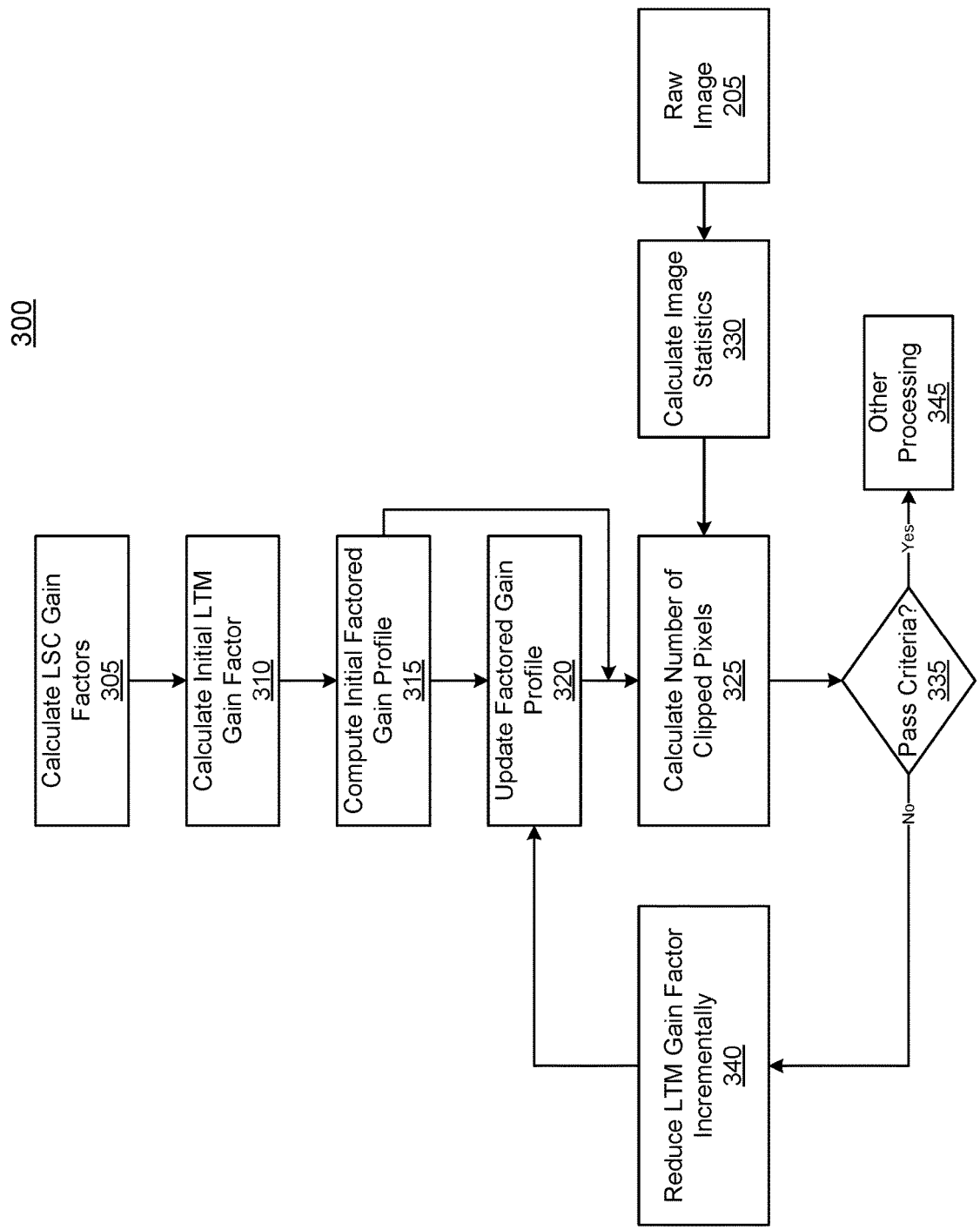
FIG. 3 illustrates another signal flow for generating LSC factors according to at least one example embodiment.

FIG. 3 illustrates another signal flow for generating LSC factors according to at least one example embodiment. As shown in FIG. 3, the signal flow 300 includes a calculate LSC gain factors 305 block, a calculate initial LTM gain factor 310 block, a compute initial factored gain profile 315 block, an update factored gain profile 320 block, a calculate number of clipped pixels 325 block, a calculate image statistics 330 block, the raw image 205 block, a pass criteria 335 block, a reduce LTM gain factor incrementally 340 block, and other processing 345 block.

The calculate LSC gain factors 305 block can be configured to calculate, determine or receive gain factors for LSC. In an example implementation, the gain factors for LSC can be adaptively calculated. For example, the gain factors for LSC can be calculated in the adaptive LSC 220 block. Therefore, the gain factors for LSC can be the factored LSC or updated LSC (gain, mesh or gain factors) used in the apply LSC 245 block. Therefore, there can be an LSC gain factor for the red channel ($LSC_{red}$), an LSC gain factor for the green channel ($LSC_{green}$), and an LSC gain factor for the blue channel ($LSC_{blue}$). The LSC (RGGB) can be factored into a color dependent correction (see FIG. 9, graph 920 or $LSC'_{\{rggb\}}$) and color-independent correction (see FIG. 9, graph 930 or LTMGain(0).

The calculate initial LTM gain factor 310 block can be configured to calculate or determine the LTM gain for each of the $LTM_{RGB}$ channels. The LTM can include a color dependent correction and an color-independent correction for each color (e.g., RGB). The initial LTM gain factor may include the gain factor for color of each color.

The (optional) compute initial factored gain profile 315 block can be configured to calculate or determine an initial LTM gain (LTMGain(0) or LTMGain$^0$). In an example implementation, the initial LTM gain can be based on the color-independent correction of the minimum LSC gain channel. For example, LTMGain(0)=Min[R(x,y),G(x,y),B(x,y)]. Therefore, calculating or determining the initial LTM gain can include determining the minimum of the LSC gain factors (or profiles) as determined in the calculate LSC gain factors 305 block. The LSC (RGGB) can be factored into a color dependent correction (see FIG. 9, graph 920 or $LSC'_{\{rggb\}}$) and color-independent correction (see FIG. 9, graph 930). The initial LTM gain (LTMGain(0) or LTMGain$^0$) can be based on the minimum LSC gain channel for the color-independent correction (see FIG. 9, graph 930). In a first iteration of a loop or test, processing can continue to the calculate a number of clipped pixels 325 block.

The update factored gain profile 320 block can be configured to update the factored gain profile (e.g., LTM gain) based on a scale factor. The reduce LTM gain factor incrementally 340 block can be configured to set the scaling factor for the LTM gain factor. The scale factor can be based on a constant (e.g., a preset constant) and a number of times (n) a loop has been processed. For example, the scale factor K(n) can be K(1−n), K*n, K$^n$, and the like. The factored gain profile can be reduced based on the scale factor. In an example implementation, the update factored gain profile 320 block can be configured to update the color-independent gain.

The calculate number of clipped pixels 325 block can be configured to calculate a number and/or a percentage of pixels that are clipped after the LTM gain (e.g., red, green, blue and intensity) have been applied. The percentage of clipped pixels can be based on a total number of pixels. Calculating the number and/or the percentage of pixels can be based on image (e.g., raw image RGGB) statistics.

The calculate image statistics 330 block can be configured to calculate image statistics of the raw image 205. For example, the statistics can include image sensor statistics relating to defective pixels, auto-exposure, noise, auto-white balance, histograms, auto-focus, flicker detection, black level compensation (BLC), sharpness maps, lens shading correction, and/or the like. The statistics may be based on a plurality of images (e.g., raw images or LSC images).

The pass criteria 335 block can be configured to determine if the number of or percentage of clipped pixels pass a criteria or threshold number. For example, the clipped pixels can pass the criteria if the percentage of clipped pixels is less than or equal to a percentage (e.g. 1%) or less than or equal to a number of pixels (e.g., 10, 50, 100, or the like). If the clipped pixels pass the criteria some other processing is performed (e.g., image processing 125 block). If the clipped pixels do not pass the criteria processing continues to the reduce LTM gain factor incrementally 340 block.

The process described above is an incremental optimization (sometimes called brute force optimization) of LTM gain. In an alternative (additional or complimentary) implementation, a probabilistic algorithm can be used. For example, the algorithm can be based on the probability of clipping the image. The algorithm can be:

$$P'_{clip} = \int_0^\infty P(\sigma_{norm}) \int_1^\infty N_{\mu', \sigma''}(x) dx d\sigma_{norm} \quad (1)$$

where,
   P is probability,
   P'clip is probability of clipping with an adjusted gain,
   σ is a gain based on statistics, μ is a gain based on LSC statistics, μ'=μ(gain), and σ"=(μ'/μ$_{norm}$)σ$_{norm}$.

In an example implementation, σ can scale with μ. Therefore, μ can be increased causing σ to increase. P'$_{clip}$ can also be calculated as μ and σ increase. As the gain is increase, P'$_{clip}$ can be tested against a criterion (e.g., a threshold probability). When P'$_{clip}$ fails the criterion, the gain can be mapped to an LTM gain for use in the pipeline LTM process.

Figure 4:
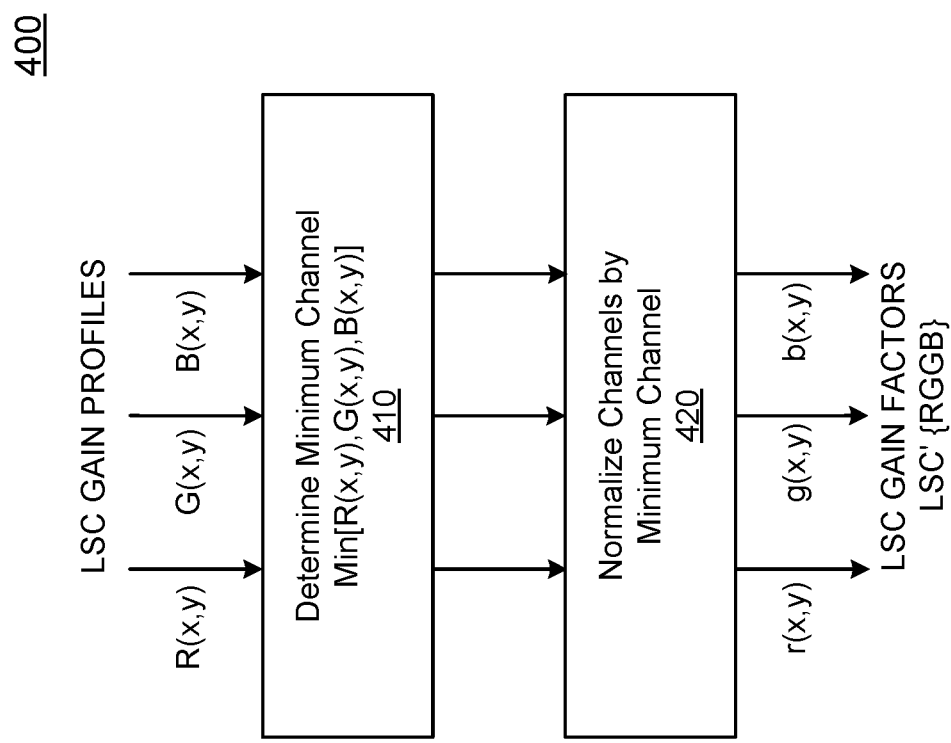
FIG. 4 illustrates yet another signal flow for generating LSC factors according to at least one example embodiment.

FIG. 4 illustrates yet another signal flow for generating LSC factors according to at least one example embodiment. As shown in FIG. 4, the signal flow 400 includes a determine minimum channel 410 block and a normalize channels by minimum channel 420 block. The signal flow begins with LSC gain profiles for the red ($R_{x,y}$), green ($G_{x,y}$) and blue ($B_{x,y}$) channels (see FIG. 9, graph 910 or LSC$_{\{rggb\}}$).

The determine minimum channel 410 block determines the minimum of the three channels. The normalize channels by minimum channel 420 block normalizes the three channels by dividing by the determined minimum channel. The result is LSC'$_{\{RGGB\}}$ or the factored LSC. LSC'$_{\{RGGB\}}$ can represent the color dependent correction factor for LSC. In an example implementation, the signal flow 400 can be implemented in the compute/update factored LTM 225 block and/or the calculate LSC gain factors 305 block.

Figure 5:
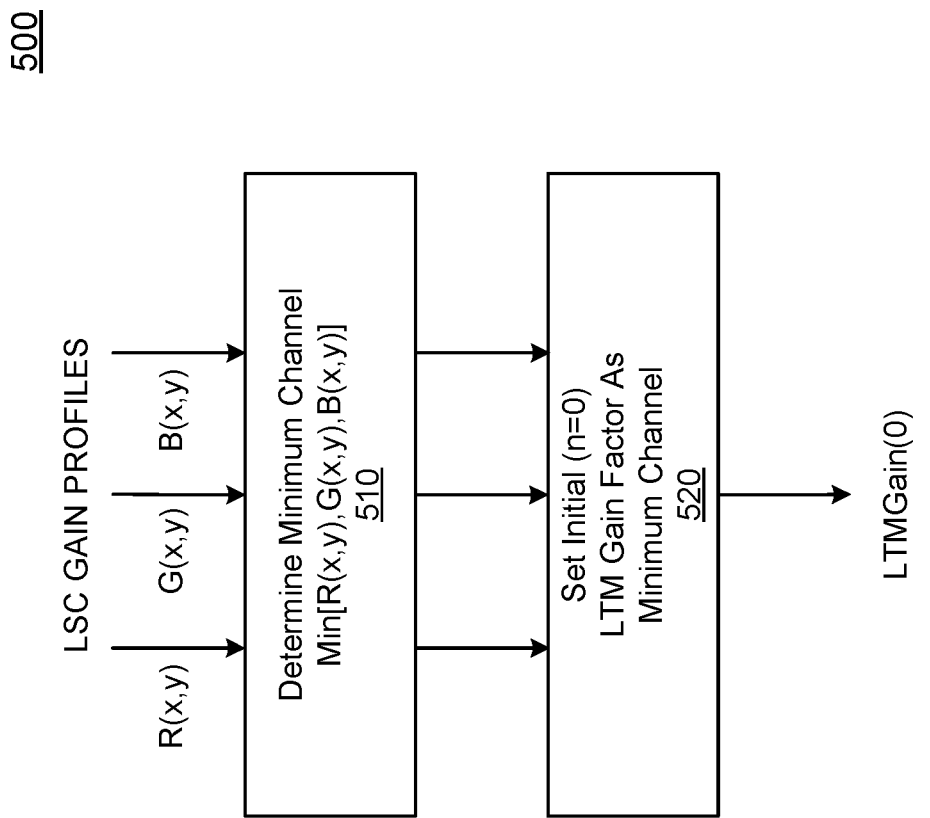
FIG. 5 illustrates a signal flow for determining an initial local tone mapping (LTM) gain according to at least one example embodiment.

FIG. 5 illustrates a signal flow for determining an initial local tone mapping (LTM) gain according to at least one example embodiment. As shown in FIG. 5, the signal flow 500 includes a determine minimum channel 510 block and a set initial LTM gain factor as minimum channel 520 block. The signal flow begins with LSC gain profiles for the red ($R_{x,y}$), green ($G_{x,y}$) and blue ($B_{x,y}$) channels (see FIG. 9, graph 910 or LSC$_{\{rggb\}}$). The determine minimum channel 510 block determines the minimum of the three channels. The set initial LTM gain factor as minimum channel 520 block can set the determined minimum channel as LTMGain (0)) or LTMGain$^0$. In an example implementation, the signal flow 500 can be implemented in the calculate initial LTM gain factor 310 block and/or the compute initial factored gain profile 315.

Figure 6:
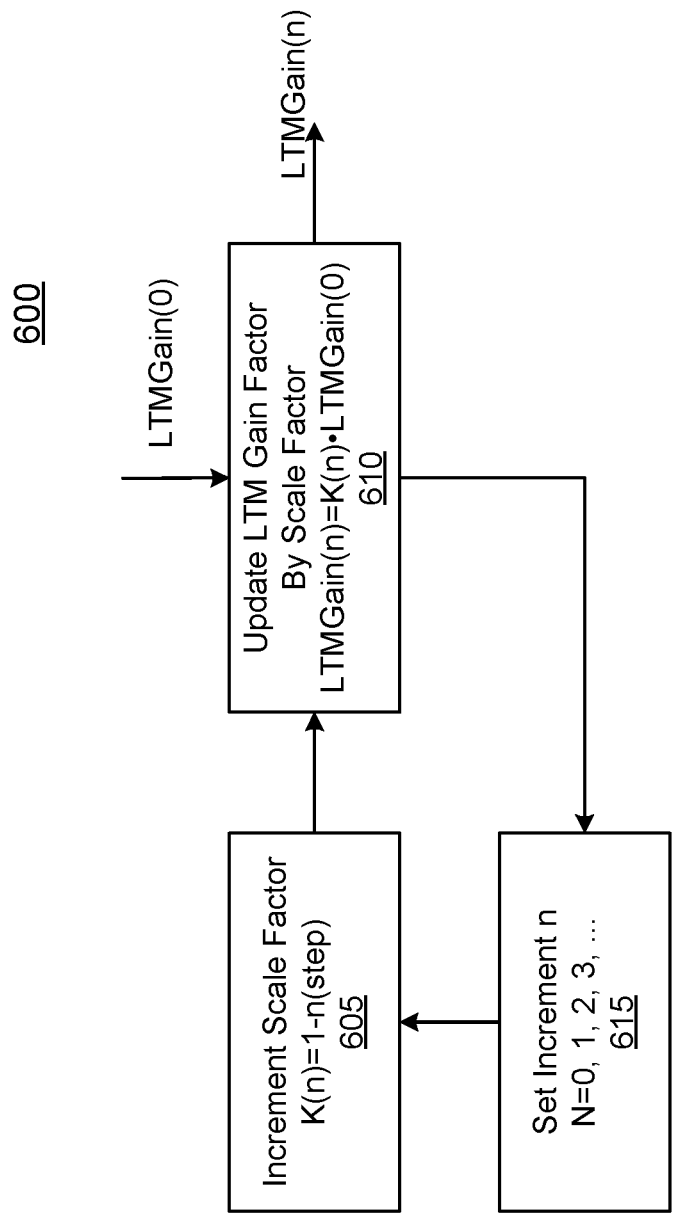
FIG. 6 illustrates a signal flow for generating an updated LTM gain according to at least one example embodiment.

FIG. 6 illustrates a signal flow for generating an updated LTM gain according to at least one example embodiment. As shown in FIG. 6, the signal flow 600 includes an increment scale factor 605 block, an update gain factor by scale factor 610 block, and a set increment n 615 block.

The increment scale factor 605 block receives a variable n from the set increment n 615 block and generates a scale factor as K(n)=1−b(step), where step is a value (e.g., a preset value) by which the gain factor reduced (e.g., divided by or subtract from). The update gain factor by scale factor 610 block uses the scale factor to reduce the gain factor. The gain factor can be the LSC gain and/or the LTM gain. For example, the signal flow 600 can be an element of signal flow 200 and/or signal flow 300.

Figure 7:
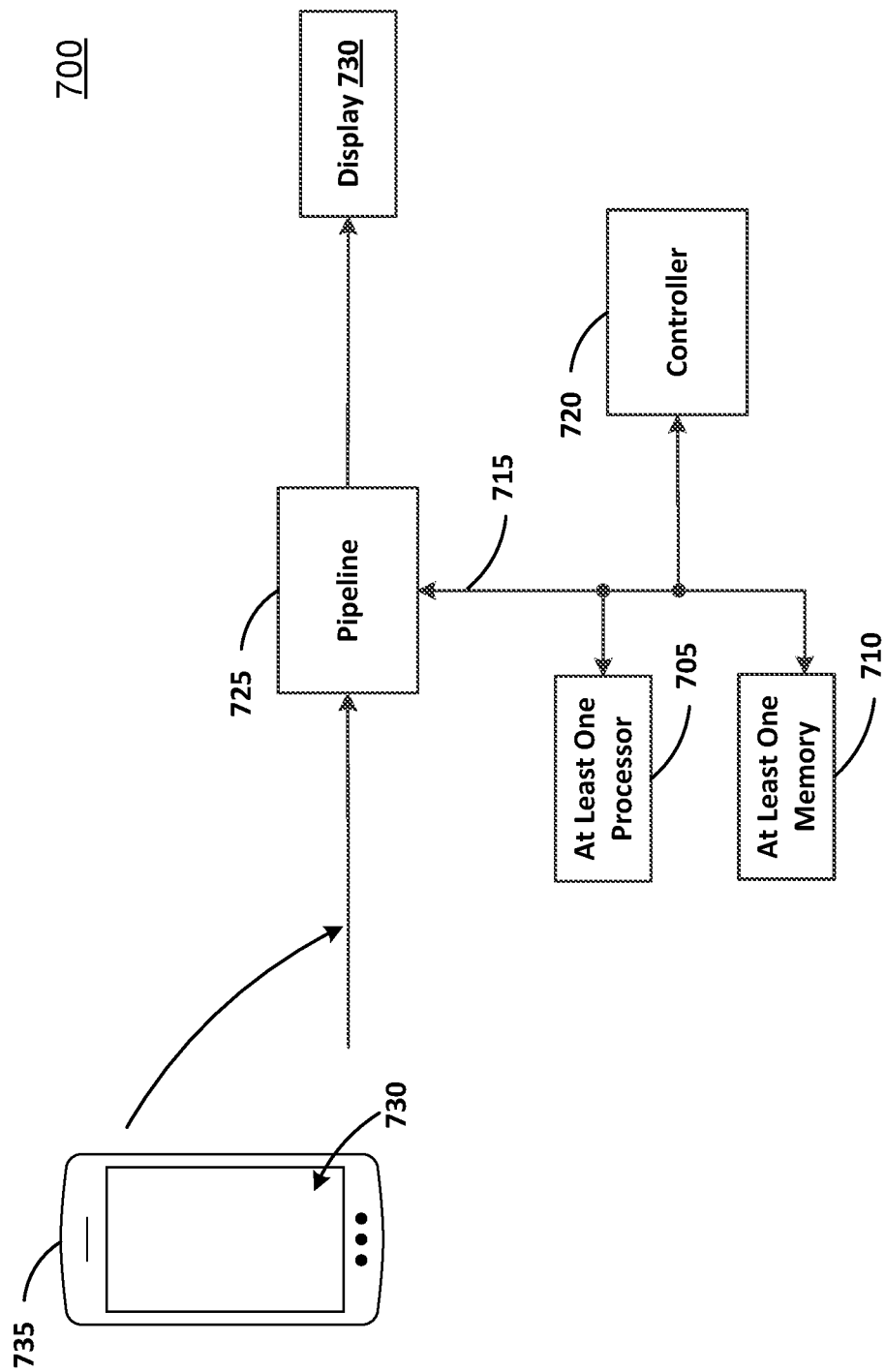
FIG. 7 illustrates a block diagram of an apparatus according to at least one example embodiment.

FIG. 7 illustrates a block diagram of an image capturing apparatus according to at least one example embodiment. As shown in FIG. 7, the block diagram of an image capturing apparatus 700 includes at least one processor 705, at least one memory 710, controller 720, pipeline 725, display 730 and device 735. The at least one processor 705, the at least one memory 710, the controller 720, and the pipeline 725 are communicatively coupled via bus 715.

In the example of FIG. 7, an image capturing apparatus 700 may be at least one computing device and should be understood to represent virtually any computing device configured to perform the techniques described herein. As such, the image capturing apparatus 700 may be understood to include various components which may be utilized to implement the techniques described herein, or different or future versions thereof. For example, the image capturing apparatus 700 is illustrated as including at least one processor 705, as well as at least one memory 710 (e.g., a computer readable storage medium).

Therefore, the at least one processor 705 may be utilized to execute instructions stored on the at least one memory 710. As such, the at least one processor 705 can implement the various features and functions described herein, or additional or alternative features and functions (e.g., an image pipeline that can reduce clipping). The at least one processor 705 and the at least one memory 710 may be utilized for various other purposes. For example, the at least one memory 710 may be understood to represent an example of various types of memory and related hardware and software which can be used to implement any one of the modules described herein. According to example implementations, the image capturing apparatus 700 may be included in larger system (e.g., a personal computer, a laptop computer, a mobile device and/or the like).

The at least one memory 710 may be configured to store data and/or information associated with the pipeline 725 and/or the image capturing apparatus 700. The at least one memory 710 may be a shared resource. For example, the image capturing apparatus 700 may be an element of a larger system (e.g., a personal computer, a mobile device, and the like). Therefore, the at least one memory 710 may be configured to store data and/or information associated with other elements (e.g., web browsing or wireless communication) within the larger system (e.g., an image pipeline that can reduce clipping).

The controller 720 may be configured to generate various control signals and communicate the control signals to various blocks in the pipeline 725 and/or the image capturing apparatus 700. The controller 720 may be configured to generate the control signals in order to implement the lens shading correction techniques described herein.

The pipeline 725 can be an image processing pipeline. The pipeline 725 can be configured to modify gain used by an LSC process and an LTM process. For example, the pipeline 725 can be configured to remove a portion of the gain in the LSC and proportionally increase the gain in the LTM. Moving gain (e.g., intensity) from the LSC to the LTM can enable or help enable the reduction or elimination of clipping in the LSC.

The at least one processor 705 may be configured to execute computer instructions associated with the pipeline 725, the controller 720 and/or the device 735. The at least one processor 705 may be a shared resource. For example, the image capturing apparatus 700 may be an element of a larger system (e.g., a personal computer, a mobile device, and the like). Therefore, the at least one processor 705 may be configured to execute computer instructions associated with other elements (e.g., web browsing or wireless communication) within the larger system.

Figure 8:
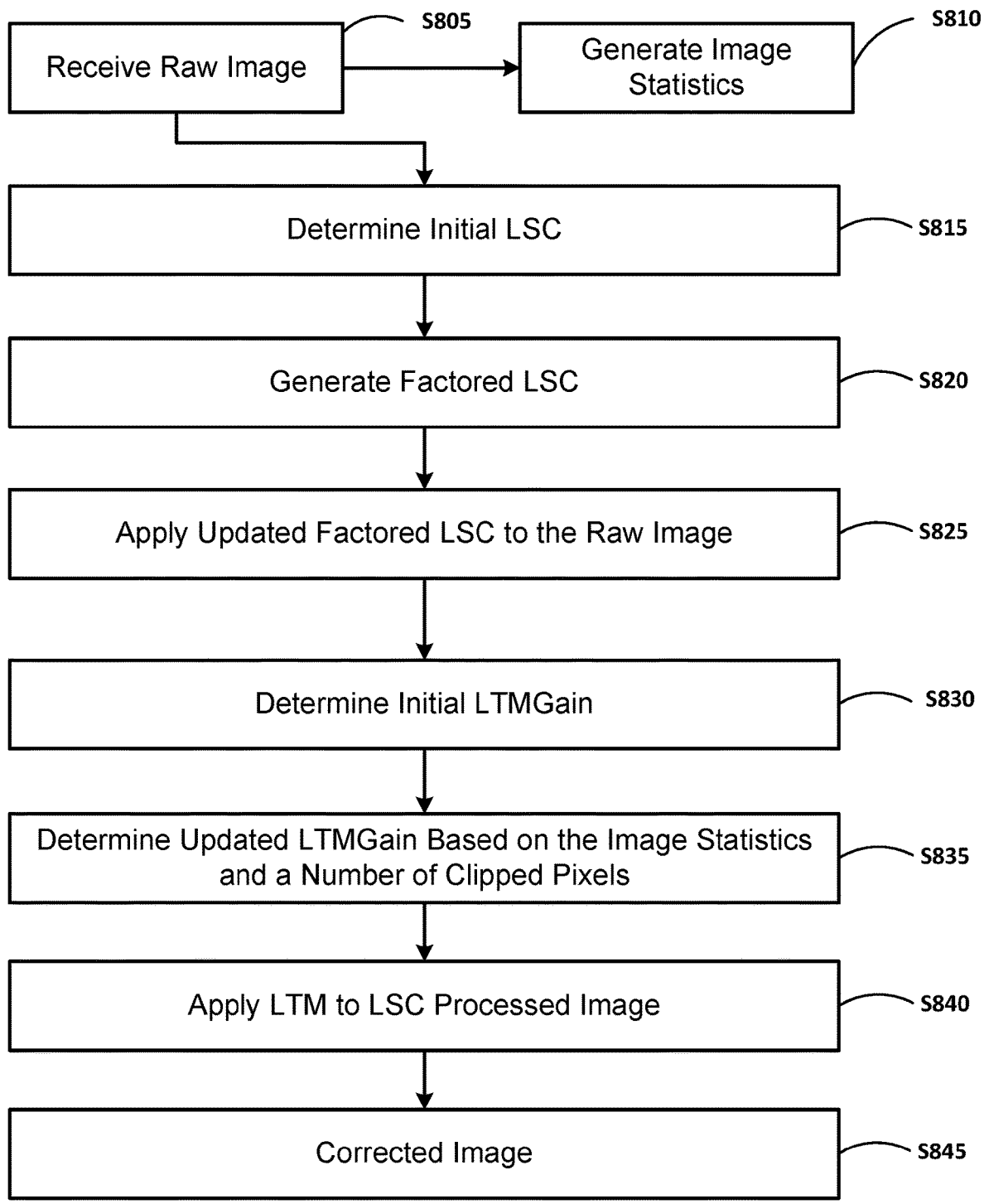
FIG. 8 illustrates a block diagram of a method for generating an LSC image according to at least one example embodiment.

FIG. 8 illustrates a block diagram of a method. The steps described with regard to FIG. 8 may be performed due to the execution of software code stored in a memory (e.g., at least one memory 710) associated with an apparatus (e.g., as shown in FIG. 7) and executed by at least one processor (e.g., at least one processor 705) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 8.

FIG. 8 illustrates a block diagram of a method for generating a lens shaded corrected image according to at least one example embodiment. As shown in FIG. 4, in step S805 a raw image is received. For example, the raw image (e.g., raw image 205). The raw image can be a single channel, two-dimensional array (x, y) of pixels having four colors. For example, the four colors typically include 25% red, 50% green, and 25% blue (RGGB). The raw image can be received from a photosensor.

In step S810 image statistics are generated. For example, the statistics can include image sensor statistics relating to defective pixels, auto-exposure, noise, auto-white balance, histograms, auto-focus, flicker detection, black level compensation (BLC), sharpness maps, lens shading correction, and/or the like. The statistics may be based on a plurality of images (e.g., raw images or LSC images). The statistics can be determined in a separate pipeline (e.g., calculated in parallel with image processing).

In step S815 an initial LSC is determined. For example, a baseline or initial LSC (LSC gain or LSC profiles) can be based on a calibration file(s) (e.g., an image). For example, the LSC can be based on a grid (e.g., 3×4, 4×3, 6×8, 8×6, 16×12, 12×16 and the like) having a constant size (number of rows and number of columns) (see, for example, FIG. 10A). The LSC (or variables used to determine gain) can be determined for each corner of the blocks of the grid, sometimes called a mesh or gain profile. The LSC can be determined based on the selected calibration files (e.g., an image) where the value for the LSC can be selected from the selected calibration files (e.g., luminance) and/or can be calculated based on the selected calibration files (e.g., derived from luminance). The LSC or LSC profile can include an LSC profile for each channel (e.g., color). In other words, there can be an $LSC_{red}$, $LSC_{green}$, and a $LSC_{blue}$ (See FIG. 9, graph 910 or $LSC_{\{rggb\}}$). In some implementations, the LSC can be used in a single channel, two-dimensional array (x,y) of pixels having four colors. Therefore, the LSC can be $LSC_{RGGB}$ (noting the LSC profile can be the same for both greens).

In step S820 a factored LSC is generated. For example, the LSC can be factored into a color dependent correction (see FIG. 9, graph 920 or $LSC'_{\{rggb\}}$) and color-independent correction (see FIG. 9, graph 930 or LTMGain(0))). The factored LSC can be normalized such that the smallest gain (e.g., at the center of the image) equals zero (0) or one (1) (e.g., a gain that does not change the value of a pixel value to which it is applied). The factored LSC can be normalized by the minimum channel (e.g., red, green, or blue) gain.

In step S825 the updated factored LSC is applied to the raw image. For example, the factored LSC (e.g., gain, mesh or gain factors) can be applied to (e.g., cause gain) the raw image to minimize or reduce lens shading. The updated factored LSC can be applied to the raw image without (or substantially without) clipping pixel values.

In step S830 an initial LTMGain is determined. For example, the LTM gain for each of the $LTM_{RGB}$ channels can be calculated or determined. The LTM gain can include a color dependent correction and a color-independent correction for each color (e.g., RGB). The initial LTM gain may include a single gain factor each color or, alternatively, a gain factor for each color. In an example implementation, calibration data can be at least one image or raw image sometimes called a light reference. In some implementations, calibration files can be images and/or data that is pre-loaded (e.g., at the factory) in the device and/or captured during a user-initiated calibration process.

In step S835 an updated LTMGain is determined based on the image statistics and a number of clipped pixels. For example, the initial (or previously updated) LTMGain can be applied to the LCS corrected image (in step S840) and a number of clipped pixels can be determined and/or estimated. If the number of clipped pixels meets a criterion, the LTM corrected image is forwarded (in step S845) for additional processing. If the number of clipped pixels meets a criterion, the LTMGain can be updated using, for example, an incremental step process (sometimes called a brute force algorithm). Alternatively, and/or in addition, the LTMGain can be updated using a statistical or probability based algorithm.

Figure 9:
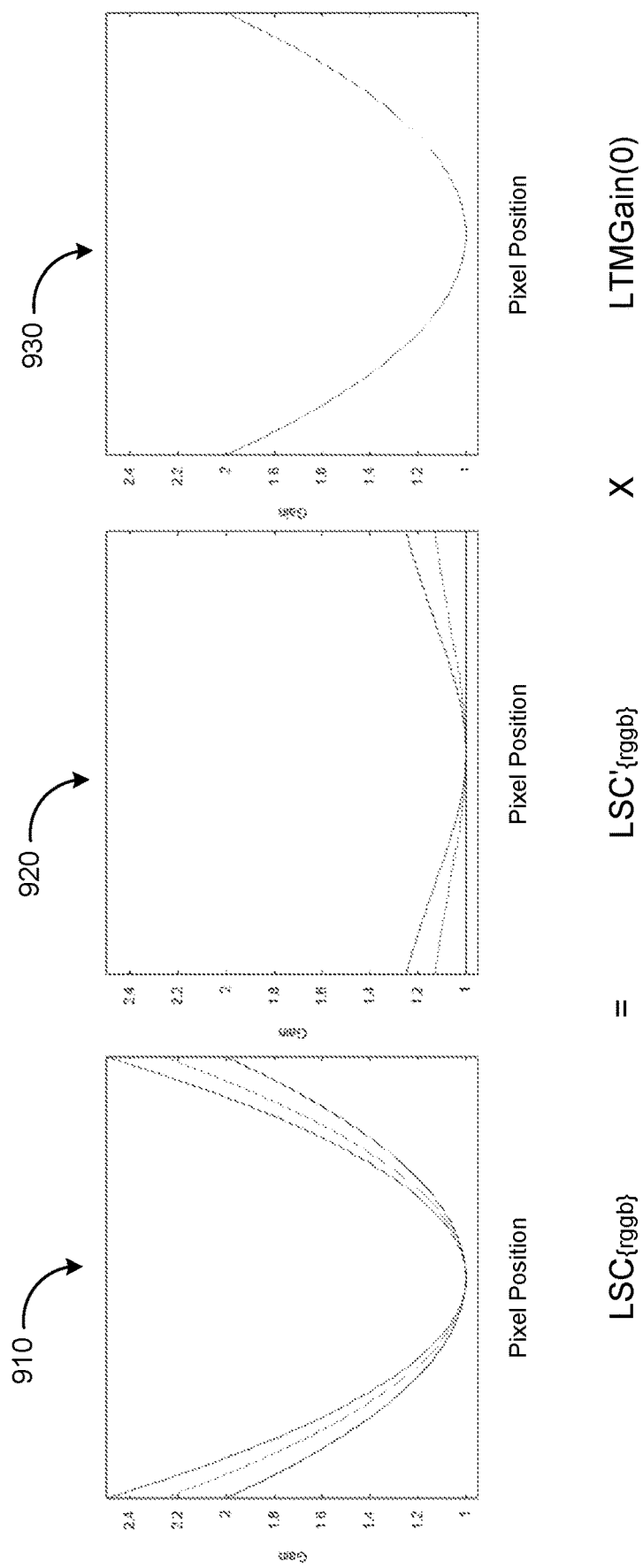
FIG. 9 illustrates a graphical mathematical derivation of LSC and LTM factors according to at least one example embodiment.

FIG. 9 illustrates a graphical mathematical derivation of LSC and LTM factors according to at least one example embodiment. As shown in FIG. 9, $LSC_{\{rggb\}}$ (910)= $LSC'_{\{rggb\}}$ (920)*LTMGain(0) (930)—that is, the total gain applied to correct a lens shading distortion includes a color-dependent gain, $LSC'_{\{rggb\}}$, that applies different gain values for different color channels of a pixel and a color-independent gain, LTMGain(0), that applies the same gain to each color channel (or intensity) for a pixel. $LSC_{\{rggb\}}$ (910) can be an initial LSC for each of red, green and blue. $LSC_{\{rggb\}}$ (910) can be based the lens shading distortion caused by, among other things, focusing light onto a photosensor. $LSC_{\{rggb\}}$ (910) can be determined from an image or image map stored in the device memory during manufacture and/or stored during a calibration operation. In some implementations, LTMGain(0) (930) can be equal to $LSC_{\{rggb\}}$ (910) for a color channel that has the lowest gain compared with other color channels (e.g., the minimum of $LSC_{red}$, LSC green and $LSC_{blue}$). The LTMGain(0) (930) can be gain that is independent of color. $LSC'_{\{rggb\}}$ (920) can be equal to $LSC_{\{rggb\}}$ (910)+LTMGain(0) (930). Accordingly, one of the LSC' (x, y) is equal to one(1) (in this case $LSC_{blue}$) for all pixels, or locations of pixels, on the sensor and the other two are the color-dependent differences in gain for the other color channels. The $LSC'_{\{rggb\}}$ (920) can be gain corresponding to color.

Figure 10A:
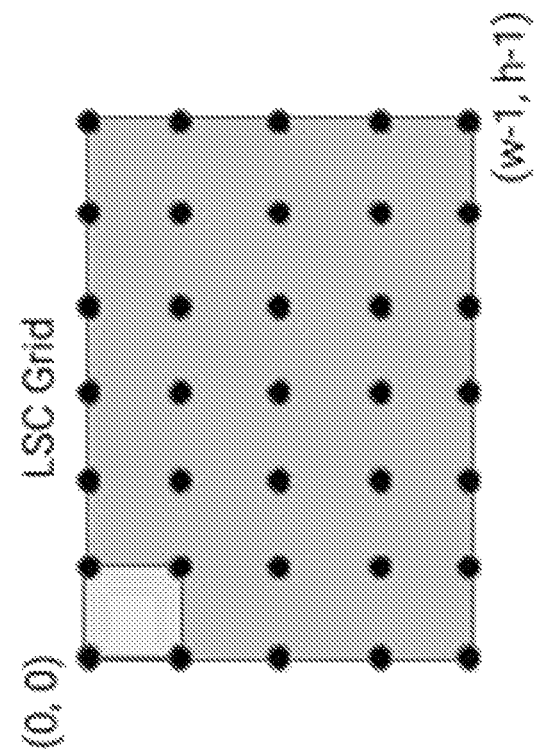
FIG. 10A illustrates an LSC grid according to at least one example embodiment.

FIG. 10A illustrates an LSC grid and FIG. 10B illustrates an LTM grid. For example, the LSC grid can have a size (number of rows and number of columns) based on the resolution of the image (FIG. 10A). The LSC (or variables used to determine gain) can be determined for each corner of the blocks of the grid, sometimes called a mesh or gain profile. The LTM grid can have a size (number of rows and number of columns) based on the resolution of the image (FIG. 10B). The LTM (or variables used to determine gain) can be determined for the center of the blocks of the grid, sometimes called a mesh or gain profile.

Figure 11:
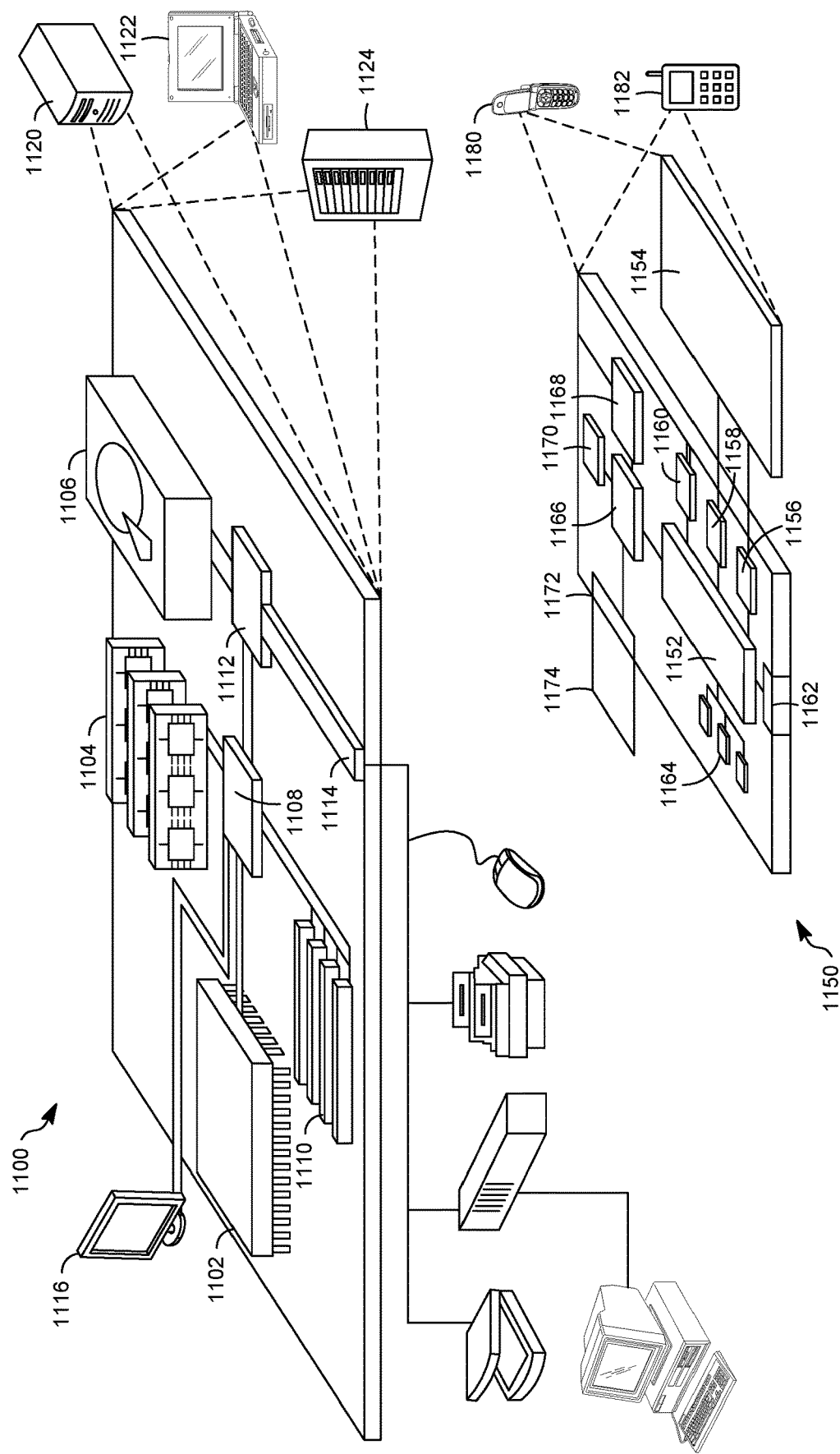
FIG. 11 shows an example of a computer device and a mobile computer device according to at least one example embodiment.

FIG. 11 shows an example of a computer device 1100 and a mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

A device, a system, a non-transitory computer-readable medium (having stored thereon computer executable program code which can be executed on a computer system), and/or a method can perform a process with a method including receiving a raw image and a stored calibration, determining a lens shading correction (LSC) gain based on the stored calibration, factoring the LSC gain into a factored gain including a local tone mapping (LTM) gain and a factored LSC gain, and applying the factored gain to the raw image to generate a corrected image.

A device, a system, a non-transitory computer-readable medium (having stored thereon computer executable program code which can be executed on a computer system), and/or a method can perform a process with a method including receiving a raw image and a stored calibration, determining a lens shading correction (LSC) gain based on the stored calibration, factoring the LSC gain into a factored gain including a local tone mapping (LTM) gain and a factored LSC gain, updating the LTM gain based on a data loss associated with applying the factored LSC gain to the raw image, applying the updated factored LSC gain to the raw image to generate an LSC corrected image, updating the LTM gain based on a number of clipped pixels associated with applying the LTM gain to the LSC corrected image, and applying the updated LTM gain to the LSC corrected image to generate a corrected image.

Implementations can include one or more of the following features. For example, the factoring of the LSC gain can includes determining a minimum gain for each color channel of the LSC gain, setting the LTM gain to the minimum of the determined minimum gain, and calculating the factored LSC gain for each color channel based on the LSC gain and the LTM gain. The LSC gain can includes determining a minimum gain for each color channel of the LSC gain and normalizing each color channel of the LSC gain based on the minimum of the determined minimum gain. The method can further include determining an amount of LSC data loss based on the raw image and the factored LSC gain, determining an adjustment factor based on the amount of LSC data loss, and updating the LTM gain using the adjustment factor to reduce the amount of LSC data loss. The amount of LSC data loss can correspond to a number of clipped pixels.

The LTM gain can be an initial LTM gain, and an updated LTM gain can be determined based on one of the initial LTM gain or the updated LTM gain and a calculated number of clipped pixels. The LTM gain can be an initial LTM gain and the method can further include applying the initial LTM gain an LSC corrected image, determining a number of clipped pixels, and determining an updated LTM gain on one of the initial LTM gain and the number of clipped pixels. The determining of the number of clipped pixels can include calculating image statistics of the raw image and computing an estimate of the number of clipped pixels based on the image statistics and the initial LTM gain. The applying of the factored gain to the raw image to generate a corrected image can includes applying the LSC gain to the raw image to generate an LSC corrected image, and applying the LTM gain to the LSC corrected image and the LSC gain can be reduced to prevent clipping and the LTM gain can be updated based on the reduced LSC gain.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for lens shading correction, the method comprising:
   receiving a raw image and a stored calibration;
   determining a lens shading correction (LSC) gain based on the stored calibration;
   factoring the LSC gain into a factored LSC gain and a local tone mapping (LTM) gain;
   applying the factored LSC gain to the raw image to generate an LSC corrected image; and
   applying the LTM gain to the LSC corrected image to generate a corrected image.

2. The method of claim 1, wherein the factoring of the LSC gain includes:
determining a minimum gain for each color channel of the LSC gain,
setting the LTM gain to the minimum of the determined minimum gain, and
calculating the factored LSC gain for each color channel based on the LSC gain and the LTM gain.

3. The method of claim 1, the factoring of the LSC gain includes:
determining a minimum gain for each color channel of the LSC gain, and
normalizing each color channel of the LSC gain based on the minimum of the determined minimum gain.

4. The method of claim 1, further comprising:
determining an amount of LSC data loss based on the raw image and the factored LSC gain;
determining an adjustment factor based on the amount of LSC data loss; and
updating the LTM gain using the adjustment factor to reduce the amount of LSC data loss.

5. The method of claim 4, wherein the amount of LSC data loss corresponds to a number of clipped pixels.

6. The method of 1, wherein:
the LTM gain is an initial LTM gain, and
an updated LTM gain is determined based on one of the initial LTM gain or the updated LTM gain and a calculated number of clipped pixels.

7. The method of claim 1, wherein the LTM gain is an initial LTM gain, the method further comprising:
determining a number of clipped pixels; and
determining an updated LTM gain based on the number of clipped pixels.

8. The method of claim 7, wherein the LTM gain is an initial LTM gain, the method further comprising:
calculating image statistics of the raw image;
computing an estimate of the number of clipped pixels based on the image statistics and the initial LTM gain; and
determining an updated LTM gain based on the estimate of the number of clipped pixels.

9. The method of claim 1,
wherein the LSC gain is reduced to prevent clipping and the LTM gain is updated based on the reduced LSC gain.

10. The method of claim 1, further comprising:
demosaicing the LSC corrected image before applying the LTM gain to the LSC corrected image, such that the LSC corrected image is demosaiced between the applying of the factored LSC gain and the applying of the LTM gain.

11. A system comprising:
a memory storing a set of instructions; and
a processor configured to execute the set of instructions to cause the system to perform operations that include:
receiving a raw image and a stored calibration;
determining a lens shading correction (LSC) gain based on the stored calibration;
factoring the LSC gain into a factored LSC gain and a local tone mapping (LTM) gain;
applying the factored LSC gain to the raw image to generate an LSC corrected image; and
applying the LTM gain to the LSC corrected image to generate a corrected image.

12. The system of claim 11, wherein the factoring of the LSC gain includes:
determining a minimum gain for each color channel of the LSC gain,
setting the LTM gain to the minimum of the determined minimum gain, and
calculating the factored LSC gain for each color channel based on the LSC gain and the LTM gain.

13. The system of claim 11, wherein the factoring of the LSC gain includes:
determining a minimum gain for each color channel of the LSC gain, and
normalizing each color channel of the LSC gain based on the minimum of the determined minimum gain.

14. The system of claim 11, the operations further comprising:
determining an amount of LSC data loss based on the raw image and the factored LSC gain;
determining an adjustment factor based on the amount of LSC data loss; and
updating the LTM gain using the adjustment factor to reduce the amount of LSC data loss.

15. The system of claim 14, wherein the amount of LSC data loss corresponds to a number of clipped pixels.

16. The system of 11, wherein:
the LTM gain is an initial LTM gain, and
an updated LTM gain is determined based on one of the initial LTM gain or the updated LTM gain and a calculated number of clipped pixels.

17. The system of claim 11, wherein the LTM gain is an initial LTM gain, the operations further comprising:
determining a number of clipped pixels; and
determining an updated LTM gain based on the number of clipped pixels.

18. The system of claim 17, wherein the LTM gain is an initial LTM gain, the operations further comprising:
calculating image statistics of the raw image, and
computing an estimate of the number of clipped pixels based on the image statistics and the initial LTM gain; and
determining an updated LTM gain based on the estimate of the number of clipped pixels.

19. The system of claim 11,
wherein the LSC gain is reduced to prevent clipping and the LTM gain is updated based on the reduced LSC gain.

* * * * *